(12) United States Patent
Gasse et al.

(10) Patent No.: US 6,616,032 B1
(45) Date of Patent: Sep. 9, 2003

(54) BRAZING COMPOSITION AND METHOD FOR BRAZING PARTS MADE OF ALUMINA-BASED MATERIALS WITH SAID COMPOSITION

(75) Inventors: Adrien Gasse, Grenoble (FR); Nicolas Eustathopoulos, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/869,022

(22) PCT Filed: Dec. 22, 1999

(86) PCT No.: PCT/FR99/03251
§ 371 (c)(1), (2), (4) Date: Jun. 22, 2001

(87) PCT Pub. No.: WO00/38875
PCT Pub. Date: Jul. 6, 2000

(30) Foreign Application Priority Data

Dec. 23, 1998 (FR) .............................. 98 16318

(51) Int. Cl.⁷ ........................ B23K 31/00; B23K 31/02; B23K 35/12; B23K 35/34
(52) U.S. Cl. ................. 228/248.1; 228/121; 228/122.1; 228/246; 228/245; 228/262.1; 228/262.9; 228/124.6; 148/22; 148/23; 148/24
(58) Field of Search ............................. 228/248.1, 121, 228/122.1, 246, 262.2–262.9, 180.22, 245, 124.6; 420/528, 552, 585; 148/421, 430, 433, 22–24

(56) References Cited

U.S. PATENT DOCUMENTS

| | | | |
|---|---|---|---|
| 3,067,508 A | 12/1962 | Kinelski | 29/487 |
| 3,519,418 A | 7/1970 | Mobley | 75/170 |
| 3,594,895 A * | 7/1971 | Hill et al. | 228/124.6 |
| 4,004,047 A * | 1/1977 | Grisik | 29/402.18 |
| 4,596,354 A | 6/1986 | Moorhead | 228/122 |
| 4,636,434 A * | 1/1987 | Okamura et al. | 228/194 |
| 4,725,509 A * | 2/1988 | Ryan | 228/262.72 |
| 4,780,374 A * | 10/1988 | Mizuhara | 420/420 |
| 5,021,105 A * | 6/1991 | Asai et al. | 148/433 |
| 5,158,229 A * | 10/1992 | Bose et al. | 228/262.1 |
| 5,330,098 A * | 7/1994 | Mizuhara | 428/646 |
| 5,340,014 A | 8/1994 | Sekhar et al. | 228/198 |
| 5,523,159 A * | 6/1996 | Kapoor et al. | 420/512 |
| 5,531,938 A | 7/1996 | Erilli | 510/417 |
| 5,598,966 A * | 2/1997 | Romano et al. | 228/124.6 |
| 5,616,424 A * | 4/1997 | Carey et al. | 428/646 |
| 5,744,255 A * | 4/1998 | Doko et al. | 165/134.1 |
| 6,027,584 A * | 2/2000 | Jackson et al. | 148/427 |
| 6,253,441 B1 * | 7/2001 | Wheat et al. | 118/504 |

FOREIGN PATENT DOCUMENTS

| | | |
|---|---|---|
| DE | 1671265 | 9/1971 |
| DE | 1671265 B * | 5/1976 |
| EP | 0 135 603 | 4/1985 |
| FR | 1269389 | 7/1960 |
| FR | 2584391 | 4/1987 |
| JP | 1178477 | 8/1986 |
| JP | 1183477 | 1/1988 |
| JP | 2088482 | 9/1988 |
| JP | 06-23583 A * | 5/2001 |

OTHER PUBLICATIONS

Wetting of Refractory Materials by Molten Metallides, J. A. Champion et al., Journal of Materials Science 8 (1973) pp. 423–426.

The Wetting of Alumina by Copper Alloyed with Titanium and Other Elements, M. G. Nicholas et al., Journal of Materials Science 15 (1980) pp. 2197–2206.

Reactive Metal Brazing, M. G. Nicholas, Harwell Laboratory, Oxon, U.K., pp. 3–17.

Microstructure and Seal Strength Relation in the Molybdenum–Manganese Glass Metallization of Alumina Ceramics, Koto White et al., Materials Science and Engineering, 75 (1985) pp. 207–213.

Direct Brazing of Alumina Ceramics, Arthur J. Moorhead, Advanced Ceramic Materials 2 (2) 159–66 (1987), pp. 159–166.

* cited by examiner

Primary Examiner—Tom Dunn
Assistant Examiner—L. Edmondson
(74) Attorney, Agent, or Firm—Pearne & Gordon LLP

(57) ABSTRACT

A refractory braze composition and process for assembling alumina-containing parts to another alumina-based material, metal or a metal alloy by reactive or non-reactive refractory brazing using a braze composition provide assemblies entirely of alumina or containing alumina and a metal or metal alloy. The braze composition is non-reactive with alumina or a reactive composition, whose reactivity with alumina is controlled, and it is formed of aluminium, of titanium, and of a matrix made up either of palladium, or of nickel, or of a nickel and palladium alloy.

35 Claims, No Drawings

BRAZING COMPOSITION AND METHOD FOR BRAZING PARTS MADE OF ALUMINA-BASED MATERIALS WITH SAID COMPOSITION

The present invention relates to a brazing composition, and to a process for assembling parts in alumina-containing materials either with themselves or with parts in metal or a metal alloy, by reactive or non-reactive refractory brazing, using said braze composition, in order to produce assemblies entirely in alumina or containing alumina and a metal or metal alloy.

The invention also concerns the refractory joint and the assembly so obtained.

By "alumina-containing" materials is generally meant all materials whose alumina content is 90% by weight or higher, these materials also comprising alumina-containing composites.

The technical field of the invention may be defined as high temperature brazing, that is to say which involves temperatures generally higher than 1200° C., which enables the assembly obtained to be used for applications requiring temperature rises which may exceed 900° C. for example and may reach 1600° C. and even higher.

It is known that it is difficult to manufacture large-size parts in ceramics, in $Al_2O_3$ in particular. After the sintering of large-size primary components in alumina, tolerances are poorly controlled and the machining of these components is unacceptable for cost-related reasons.

In addition, and for the same reasons, it is generally difficult to manufacture parts of complex shape with ceramics of oxide type such as alumina.

It is therefore often preferable to produce large-scale and/or complex shape parts or structures from ceramic parts of simple shape and/or of small size, and then to assemble these parts to produce the end structure.

On account of the high temperatures, close to 1000° C. for example, that are used in the applications of ceramics such as alumina, the assembly of these ceramics by bonding with organic products is excluded since these products do not withstand temperatures above 200° C.

Also, conventional assembly techniques by welding which use a beam of energy with or without filler metal (Tungsten Inert Gas welding, electron beam or laser welding) involving partial fusion of the parts to be assembled cannot be used for the assembly of ceramics since a substrate or a part in ceramic cannot be directly melted without causing its destruction since it may decompose before fusion.

In consequence, welding by solid phase diffusion, assembly-sintering and reactive brazing are currently the most frequently used techniques to produce refractory assemblies of ceramics.

Solid phase diffusion welding and assembly-sintering have the disadvantage of being restrictive in their application.

In respect of solid phase diffusion, the shape of the parts must remain simple if uniaxial pressing is used or else it requires complex tooling and preparation comprising for example the manufacture of a casing, vacuum sealing, hot isostatic compression, and final machining of the casing if hot isostatic compression is used. This technique is therefore not economically viable.

In respect of assembly-sintering, the same problems arise (shape of the parts, complex implementation) with in addition the need to control the sintering of a filler powder to be inserted between the two materials to be assembled.

These two techniques also require the use of temperature stages or cycles of long duration (one lasting several hours) at high temperature since the processes involve solid state diffusion which could, in respect of the diffusion mixture, promote the enlarging of the metal alloy grains for metal-ceramic assemblies.

Brazing is a cheap technique, easy to implement and is moreover the most frequently used technique. Complex-shaped parts may be produced by capillary brazing and operations are limited to placing the filler metal or alloy, called "braze", between or in the vicinity of the parts to be assembled, and to melt the braze to obtain the joining of the parts after cooling.

Brazing of ceramics must overcome the fundamental problem of the poor wettability of ceramics by metals. Indeed, the usual braze compositions which contain low melting-point metals such as silver, copper, gold and their alloys do not wet ceramics, even though they can wet metal materials. This problem is overcome by conducting surface treatment prior to brazing by choosing special alloy compositions and/or by optionally adding a reactive element as is the case for so-called "reactive brazing".

For this last technique, a metal alloy composition is used, most often containing copper or silver, and a reactive element is added such as Ti, Zr, V, Hf, Nb. . . .

The reactive element acts by decomposing the surface of the ceramic and reacting with it to form a very stable nitride, oxide, silicide or carbide compound depending upon the type of ceramic involved. This layer generally imparts very good wetting properties to the ceramic and satisfactory bonding.

If we focus particularly on oxide ceramics, the latter, in particular alumina, are only scarcely reactive and consequently, aside from the very reactive chemical elements such as Ti, Zr and Hf, most of the transition metal elements do not wet and do not adhere to an alumina surface, as is the case in particular for the elements Ni, Fe, Cu, Mn, Co, Pt, Au, Ag, Pd, etc.

It is therefore generally necessary to conduct a surface treatment in order to metallize alumina before it is brazed, that is to say that a thin metal layer is deposited that adheres strongly to the ceramic and will act as an interface between the braze and the ceramic.

The process the most frequently used for metallizing manganese ceramics is the so-called moly-manganese process in which a suspension or paste containing a powder mixture of molybdenum and manganese is applied to the ceramic and annealed in a wet reducing atmosphere of hydrogen or ammonia. This reducing atmosphere is necessary to maintain the molybdenum in the metal state, while a certain water vapour content leads to oxidizing the metal manganese.

Even though this process functions relatively well for ceramics containing 94–96% alumina, it cannot be applied to ceramics with an alumina content of 99.5%, which is why in the document by K. WHITE, D. KRAMER, Materials Science and Engineering, 75 (1985) 207–213 "Microstructure and seal strength relation in the molybdenum-manganese glass metallization of alumina ceramics", the description is given of the addition of manganese glass (Mno—$SiO_2$ —$Al_2O_3$) to molybdenum powder instead of pure metal.

The glass which forms during annealing at a temperature of 1500° C. penetrates inside the grain joints of the ceramic and creates a vitreous matrix in which the metal particles are trapped, which promotes metallization.

The deposit is then metallized by electrolysis with a layer of nickel or palladium, and the actual so-called brazing is carried out using a silver-based braze composition.

This process is heavy and complex to implement owing to the use of a hydrogenated reducing atmosphere and since it comprises four successive stages.

A second technique, which is the reactive brazing technique, consists generally of causing the alumina surface to react with a very reactive element chosen, for example, from among Ti, Zr and Hf, Nb, Al and Cr.

Reactive brazing is suitable for the assembly of oxide ceramics such as alumina, since reactivity is limited and the mechanical performance of the formed oxides is satisfactory.

This second technique itself comprises several variants among which mention may be made of indirect reactive brazing and direct reactive brazing.

For indirect brazing (which is similar to the metallization technique) a layer of reactive metal is previously deposited on the alumina, such as titanium for example, either in the form of a metal layer made by PVD (Physical Vapour Deposit) or CVD (Chemical Vapour Deposit), or in the form of titanium hydride.

Indirect brazing is a costly method that is difficult to implement since it requires two steps, and in addition the handling of titanium hydride is delicate since this product is very unstable. Finally, brazing is conducted at temperatures generally lower than 950° C. and the operating temperature of the assemblies does not exceed 400° C.

For direct brazing, a braze composition is used which already contains the reactive elements associated with a matrix formed of a conventional braze metal.

Hence, document EP-A-0 1135 603 (GTE Products Corporation) describes a ductile alloy for brazing a part in ceramic and a part in metal alloy for example, containing 0.25% to 4% of a reactive metal chosen from among titanium, vanadium, zirconium and their mixtures, from 20 to 85% silver, from 1 to 70% copper or aluminium, and from 3 to 30% palladium.

The braze described in this document has a liquidus temperature of approximately 600 to 950° C. which corresponds to an operating temperature as low as 400° C., that is to say largely insufficient for high temperature applications close to 1000° C. or over, for example up to 1600C.

Also, as shown in the document by M. G. NICHOLAS, Reactive Metal Brazing, Joining Ceramics Glass and Metals, Ed. W. KRAFT 1989, Bad Nauheim (Germany), pp 3–16, the braze compositions containing conventional braze metals and elements chosen from among Al, Cr, Hf, Nb, Ti and Zr to promote the wettability of ceramics such as $Al_2O_3$, must meet numerous very demanding criteria connected to the fact that it is essential, during the production of an assembly of ceramics between themselves or with a metal, to limit the residual stresses which develop during cooling, due to a differential in the coefficient of thermal expansion between the two parts to be assembled if they are of different type, but also between the ceramic and the braze for assemblies of two ceramics of same type.

Consequently, the coefficient of thermal expansion of the braze must closely correspond to that of the ceramic parts to be assembled. Yet, brazes which contain an active metal, for example those obtained by including titanium in an eutectic Cu—Ag alloy, are harder and less ductile than conventional metal braze materials.

Moreover, braze materials containing active metals are not able to flow as easily as conventional braze alloys.

Finally, in all reactive brazing processes, control over reactivity is essential, since excess reactivity is detrimental to the resistance of the assemblies, and this type of braze composition uses highly oxidizable elements which, at average assembly temperatures, require operation under extreme vacuum conditions or the use of a reducing gas.

Numerous reactive braze compositions have been put forward. For example document U.S. Pat. No. 5,351,938 describes ternary alloys for reactive joining containing 70 to 85 atomic % zirconium, 15 to 30 atomic % Ni, and titanium for low temperature joining (soldering). The assembled ceramics are oxide type ceramics, such as $Al_2O_3$.

The high reactivity of Ti and Zr on alumina requires extremely severe control over the soldering cycle in order to prevent the formation of a thick reactive layer which would harm the mechanical resistance of the assembly.

Document JP-A-02 088 482 describes a process for metallizing or assembling ceramics, $Al_2O_3$ in particular, using solder compositions based on an alloy containing at least one metal chosen from among Ag, Cu, Ni, Al and Mn, to which Ti and/or Zr have been added. The metallization or assembly is made under reduced pressure of inert gas or nitrogen or a mixture thereof. The solder composition also contains at least one metal chosen from among In, Sn, Zn and Bi. The latter elements are considered to be scarcely refractory and are used as flux to reduce the melting point of the alloy. The alloys described in this document are therefore fully unsuitable for the refractory brazing of alumina and are contrary to the desired objective.

Document JP-A-01 183477 suggests assembling parts in metal and parts in ceramic by the formation of a thin layer of metal on the assembly surface of the ceramic part, in $Al_2O_3$ for example. The metal deposited by ion plating is either aluminium, or titanium, or nickel. Joining is then conducted by metal fusion.

This technique requires the depositing of a thin layer and uses a single metal. With pure Al, the refractoriness of the assembly is limited to 660° C.; with pure Ti, and at its melting temperature, it is very difficult to control reactivity owing to the very high reactivity of titanium with alumina; finally, it is known that pure Ni does not wet alumina as indicated above, which will lead to numerous porosities in the joint and be detrimental to the seal and mechanical resistance of the assembly.

Document JP-A-61 178477 concerns a composition for ceramic metallization, such as $Si_3N_4$, SiC or alumina containing a titanium hydride (2 to 50% by weight) and aluminium (50 to 98% by weight).

Firstly, metallization requires the application of considerable pressure, which is economically unacceptable with its inherent constraints, and secondly the use of a hydride raises the problem of its stability and delicate handling. The very high proportion of Al also imparts poor refractory properties to the alloy since it is proposed to assemble the metallized ceramic with pure Al.

Document FR-A-2 584 391 describes a process for assembling metals and ceramics, such as alumina, among themselves or between each other, which consists of placing between the parts to be assembled a braze composition made up of a trinickel aluminide $ALNi_3$ (23 to 25 at % Al) and to bring the assembly to a temperature of 1450 to 1550° C. under non-oxidising conditions.

This process is very sensitive to oxygen, as is shown by the dispersion of results. While the addition of C makes it possible to obtain better reproducibility, it requires the use of an excellent vacuum or an atmosphere of very high purity. In addition, it is known that nickel tri-aluminide does not adhere to alumina, as indicated in the document by J. A. CHAMPION, B. J. KEENE, S. ALLEN, Wetting of refractory materials by molten metallides, Journal of Materials Science 8 (1973) 423–426, which examines the wettability of ceramics, such as $Al_2O_3$, SiC, $Si_3N_4$ and BN by various intermetallic compounds such as $TiAl_3$, $TiSi_2$, TiNi, $TiNi_3$, $TiCr_2$, $Cr_3Si_2$, $Fe_2Al_5$, FeSi, $Fe_2Si_5$, CoSi "$CoSi_3$", $Ni_2Si$ and $Nc_3Al$, by silicon and by a nickel alloy, and demonstrates that alumina does not react with and is not wettable by suicides, silicon and aluminides. It is confirmed that only those compounds containing titanium can wet alumina to a certain extent.

The document by A. J. MOORHEAD "Direct Brazing of Alumina Ceramics", Advanced Ceramic Materials, 2 [2] 159–66 concerns active braze compositions, Ni-25 Al, Ni-19 Al-4 Ti-0.2 B and Ni-14 Al-10 Ti-0.2 B, whose wettability is not satisfactory, while the resistance of the joint in all cases is very weak or non-existent.

It arises from the above, that the performance of braze compositions on alumina in terms of wettability and bonding is difficult to predict.

Even if the use of a filler material such as Ti is widely applied for the production of braze materials for alumina, the documents cited above clearly show that numerous compositions are unsuitable without it being possible to predict this unsuitability beforehand.

This is confirmed in the document by M. G. NICHOLAS, T. M. VALENTINE, M. J. WAITE, The wetting of alumina by copper alloyed with titanium and other elements, Journal of Materials Science 15 (1980) 2197–2206, which examines the wettability of alumina by ternary alloys of copper, titanium and aluminium, gallium, gold, indium, nickel or silver.

Additions of titanium enable the copper to wet the alumina on account of the formation of a reaction product rich in titanium at the ceramic-alloy interface. Additions of indium are very beneficial, addition of Al, gold and silver of average benefit and additions of gallium or nickel bring little or no advantage.

This document shows the imprecise understanding of the mechanisms through which the ternary filler elements influence wetting performance.

In addition, wetting is only one of the criteria to be met for a braze to be considered satisfactory, there are many others among which may be cited the formation of a strong interface between the ceramic and the solidified braze. Indeed, wetting and bonding properties strongly depend upon the type and thickness of the reaction product at the interface between the braze and the alumina. The interactions involved are complex and difficult to predict for binary alloys and impossible to predict for ternary alloys.

Document U.S. Pat. No. 5,340,014 describes a process for assembling or coating parts in metal or ceramic using a suspension containing at least two elements chosen from among the following: $TiO_2$, $B_2O_3$, Al, SI, Ti, B, Ni, P, $Cr_2O_3$, C, NB, Zr, Ta, Mo, Hf and V. For assembly, the elements are chosen from the group made up of $TiO_2$, $B_2O_3$, Al, Ti, B, Ni and P; Ti and B; Ti, B, Ni and P; $Cr_2O_3$, C and Al. Once the suspension is applied to the surfaces to be assembled, it is ignited to cause an exothermic reaction by combustion. The elements must therefore be chosen such as to produce said reaction.

The compositions described with more precision solely concern the coating and not the assembly of ceramics and contain from 60 to 68% titanium and from 32 to 40% aluminium (examples 1 to 5), example 2 concerns a suspension containing 64% titanium and 36% aluminium.

The given examples of assemblies are solely metal-to-metal assemblies.

It was seen above that, for all technical ceramics, it is difficult to produce parts of complex shape in alumina, and it is therefore frequently necessary to produce structures from ceramic elements of simple shape and then to assemble these in order to obtain the end structure.

Also, the production of technical ceramic parts with precise dimensions still remains poorly controlled and the machining of such parts is unacceptable, in particular for reasons of cost.

At the current time, the need therefore exists for a braze composition and a process with which it is possible, by brazing between two ceramics of same type, such as alumina or between alumina and a metal or a metal alloy, to achieve strong joints which are also highly refractory, that is to say able to withstand temperatures possibly reaching 1500° C. and even beyond.

None of the brazing processes and braze compositions described in the documents of the prior art meet this need.

In particular none of the compositions of the prior art simultaneously fulfils the following criteria, identified by the inventors, which are fundamental to produce structure components in ceramic, such as $Al_2O_3$, or in ceramic and a metal or a metal alloy, involving joints, in particular highly refractory joints.

1. The braze composition must make it possible to achieve a strong bond between the two parts in ceramic such as alumina or the part in ceramic and the part in metal or a metal alloy, which implies either a non-reactive braze composition, that is to say chemically compatible with alumina, or a reactive composition but whose reactivity is fully controlled and does not lead to deterioration of the ceramic properties of the alloy.

2. The braze composition must properly wet and adhere well to the silicon carbide.

3. The braze composition must have a coefficient of thermal expansion that is suitable for alumina, that is to say close to the coefficient of thermal expansion of the latter and/or act in highly ductile manner to remove any residual stress which may occur within the joint during cooling and to guarantee no onset of cracking which would be detrimental to the mechanical resistance of the assembly.

The coefficient of thermal expansion must also be adapted to the metal or metal alloy it is desired to assemble with the alumina.

4. The braze must be ductile and easy to use.

5. Finally, the joint must be highly refractory, that is to say with a very high brazing temperature, from 1200 to 1700° C. for example, enabling it to withstand temperatures of use of 1500° C. and over.

Also, having regard to the above, it appears that the formulation of a braze composition, for the brazing of alumina-based parts between themselves or with parts in metal or a metal alloy, is unpredictable and absolutely cannot be deducted from the properties of known braze materials.

The purpose of the invention is therefore to provide a braze composition and a process for the assembly by brazing of parts or components in alumina-based materials either between themselves or with parts in metal or a metal alloy, which, among others, meet the above-cited needs and which fulfil all the requirements and criteria mentioned above, which overcome the disadvantages, defects, limitations met with the compositions and processes of the prior art, and with which it is possible to produce highly refractory joints.

This purpose and others are achieved, according to the invention, in a first variant by means of a refractory braze composition that is non-reactive with alumina made up of 2 to 10 at % aluminium, 2 to 10 at % titanium, and from 80 to 96 at % of a matrix formed either of palladium, or of nickel, or of a nickel and palladium alloy in all proportions. By all proportions is preferably meant from 0 to 100% Ni and from 0 to 100% palladium.

Preferably, said refractory braze composition that is non-reactive with alumina is made up of 2 to 5 at % aluminium, from 2 to 5 at % titanium, and from 90 to 96 at % of a matrix formed as described above.

The same purpose is attained, according to the invention, in a second variant, with a reactive refractory braze composition whose reactivity with alumina is controlled, made up of 2 to 48 at % aluminium, from 10 to 96 at % titanium and from 2 to 80 at % of a matrix formed either of palladium, or of nickel, or of an alloy of palladium and nickel in all proportions, provided that the atomic percentage of titanium is greater than the atomic percentage of aluminium.

Preferably, said reactive refractory braze composition, whose reactivity with alumina is controlled, is made up of 15 to 30 at % aluminium, from 20 to 35 at % titanium, and from 45 to 60 at % nickel, on the same condition that the atomic percentage of titanium is greater than the atomic percentage of aluminium, that is to say that the Ti/Al ratio of the atomic percentage of titanium over the atomic percentage of aluminium is greater than 1.

Another preferred reactive refractory braze composition, whose reactivity with alumina is controlled, is made of 2 to 10 at % aluminium, from 35 to 50 at % titanium and from 45 to 55 at % nickel, the above-mentioned condition evidently remaining valid.

By reactive brazing, and respectively a reactive braze, is meant that there is a reaction between the braze and the alumina leading to an interface reaction product; by non-reactive brazing is meant that there is no intermediate reaction product but that there does however exist strong bonding between the braze and the alumina.

Both the reactive braze compositions and the non-reactive compositions, according to the invention, are made up of a matrix of Ni and/or Pd to which both aluminium and titanium have been added.

The braze compositions of the invention, whether reactive or non-reactive, meet the needs, fulfil all the requirements and criteria mentioned above, and do not have the disadvantages of the braze compositions of the prior art.

The braze compositions of the invention, whether reactive or non-reactive, in unexpected manner, make it possible to achieve a significant improvement in the wetting of the braze composition on the alumina, as well as strong bonding between the braze composition and the substrate, and they are highly refractory with a solidus temperature generally between 950 and 1650° C., which corresponds to a temperature of use for the assembly of generally between 900 and 1500° C. More precisely, the solidus temperature is generally between 1300 and 1500° C. for non-reactive compositions, and generally between 950 and 1650° C. for reactive braze compositions, which corresponds respectively to operating temperatures of the assemblies which generally range from 1200 to 1450° C., and from 900 to 1600° C.

The reactive compositions have a wide solidus range which makes them suitable for a large number of applications requiring variable "refractoriness".

The inventors have found, in unexpected manner, that for the fulfilment of the above-mentioned criteria and in particular for improved wetting and bonding while maintaining a braze composition that is highly refractory, it is necessary to remain within the specific atomic percentage domains mentioned above, that is to say the domains in which the braze composition is either non-reactive or reactive but with controlled reactivity.

The composition domains of ternary or quaternary Al, Ti, Pd and/or Ni alloys in which these alloys are non-reactive or have controlled reactivity, which both lead to the desired properties, are absolutely not predictable, as indicated above when examining the prior art.

The specific braze composition domains of the invention, with which it is possible to achieve highly refractory, very resistant joints between two alumina-based parts and between alumina-based parts and parts in metal or a metal alloy, are neither described nor suggested in the prior art.

More precisely, for non-reactive braze compositions, it is known, as indicated above, that nickel and palladium only adhere weakly to alumina without wetting it.

The inventors have observed, in surprising manner, that the addition to these metals of small quantities of aluminium and titanium—typically 10 at % or less—make it possible to obtain a significant improvement in wetting, while achieving good bonding of the alloy with the substrate.

Examination under a microscope of the interface shows the absence of any interface reaction product. In other words, very good chemical compatibility is obtained since no reaction occurs, together with very good mechanical compatibility since good bonding is achieved.

The absence of reactivity protects the joint against any risks of cracking which could be induced by a thick, weakening reaction product.

Outside the non-reactive braze compositions defined by the specific percentages of the invention, and in the absence of any reaction, an improvement in wetting is observed but mechanical bonding is seen to deteriorate.

More precisely, in respect of reactive braze compositions having controlled reactivity with alumina according to the invention, the inventors have observed that the addition to the non-reactive braze compositions of the invention of greater quantities of titanium led to the formation of an interface reaction product containing titanium and oxygen and to the formation of a strong interface between the braze and the alumina. If this reaction is not controlled, it leads to deterioration of the mechanical properties of the alloy.

In unexpected manner, it was found by the inventors that the supplementary addition of aluminium to the braze, to place it in the specific ranges of the invention, made it possible to fully control the reaction with the alumina, that is to say to obtain a reaction product of narrow thickness and controlled composition ensuring strong bonding between the alumina and the braze.

Also, with these alloys a strong improvement is achieved in wetting and in the angle of contact between the braze and the alumina which becomes 600 or less.

This last point is of utmost importance since it provides for capillary brazing, namely infiltration of the braze into the braze joint without depositing the braze directly between the parts to be assembled, which greatly simplifies assembly design. Controlled reactivity, just like no reactivity, protects the joint against any onset of cracking which could be induced by a thick reaction zone which would have a weakening effect.

Among the advantages common to the braze compositions of the invention, whether non-reactive or reactive, mention may be made, among others, of:

the coefficients of thermal expansion suitable for alumina;
easy, reliable use at low cost since the braze composition only contains non-expensive elements.

The compositions of the invention fulfil, among others, the twofold criteria of coefficient of thermal expansion and viscosity for problem-free joining, in particular of thick joints—that is to say joints generally having a thickness of 0.1 to 0.5 mm.

The braze compositions of the invention offer the possibility of brazing alumina not only to itself but also to metals or metal alloys.

The braze compositions of the invention have strong resistance to oxidation, for example under highly oxidizing atmospheres owing to the presence of titanium and aluminium which both lead to the formation of a passivating surface layer.

The braze of the invention also has the advantage of being little sensitive to corrosion, by oleum for example and nitric acid.

In addition, since the braze compositions of the invention are little sensitive to oxygen, both the non-reactive brazes and—which is more surprising—the reactive brazes with controlled reactivity, the quality of the atmosphere in the brazing furnace is less critical and wetting is immediate, even with atmospheres having a non-negligible partial oxygen pressure, such as commercial quality argon, and brazing can be conducted in a vacuum or in an ordinary (protective) atmosphere of neutral or reducing gas. Said gas is chosen for example from among hydrogen, argon, nitrogen and their mixtures, such as argon/hydrogen mixtures.

Among the advantages specific to the non-reactive braze compositions of the invention, particular mention may be made of the fact that these brazes are ductile and can therefore be easily used in strip, foil or other form, by rolling for example, and the fact that these alloys maintain their ductility after brazing and are therefore able to absorb cyclic demands.

To a large extent, the reactive braze compositions with controlled reactivity of the invention, are also ductile. At all events, these compositions may be easily applied in powder or strip form.

The invention also concerns an assembly process for an alumina-based part with at least one other part in an alumina-based material and/or at least one part in metal or a metal alloy, by non-reactive refractory brazing in which, according to a first variant, said parts are contacted with a braze composition that is non-reactive with alumina, such as described above, and the assembly formed by the parts and the braze composition is heated to a sufficient brazing temperature to cause the braze composition to melt in order to form a refractory joint.

The invention also concerns an assembly process for a part in alumina-based material with at least one other part in an alumina-based material and/or at least one part in metal or a metal alloy, by reactive refractory brazing in which, according to a second variant, the said parts are contacted with a braze composition whose reactivity with alumina is controlled, such as described above, and the assembly formed by the parts and the braze composition is heated to a sufficient brazing temperature to cause the braze composition to melt in order to form a refractory joint.

Both for non-reactive brazing and for reactive brazing with controlled reactivity, the brazing temperature is generally 25° C. and preferably 50° C. greater than the liquidus temperature of the braze composition.

For non-reactive brazing, the brazing temperature generally ranges from 1400° C. to 1600° C., and for reactive brazing the brazing temperature generally ranges from 1000° C. to 1750° C., preferably from 1050 to 1700° C., and further preferably from 1100 to 1700° C.

In both cases, the brazing temperature must be lower than the melting point of the metal or metal alloy for the production of alumina/metal assemblies.

Most of the advantages of the process of the invention are advantages inherent in the braze used and have already been described above.

As other advantages of the process of the invention, both in its first and in its second variant (non-reactive or controlled reactivity) mention may also be made of:

short brazing times, for example of only 5 to 10 minutes, which for alumina-metal or metal alloy assemblies avoids grain enlargement of the refractory metals or metal alloys. In addition, the braze time parameter is no longer critical, and if necessary, for example when brazing parts of large size and/or in the event of heat inertia of the furnace, the brazing time can be easily extended or adapted;

great simplicity leading to low overall costs of the process, it being particularly possible with the process of the invention to assemble alumina with alumina or with metals or metal alloys in a single operation.

The process of the invention is generally conducted by forming a powder of the braze composition, placing this powder in suspension in an organic binder and coating the assembly surfaces of the parts to be assembled with this suspension. This braze composition may be applied to the assembly surfaces of the parts to be assembled ("between the parts") and/or in the vicinity of these surfaces to be joined.

It is also possible for the braze composition to be placed in strip or foil form, for example by rolling, and to place this strip or foil between the surfaces of the parts to be assembled and/or in the vicinity of these surfaces.

Preferably, the strip is inserted between the parts to be assembled.

It was seen above that one of the advantages of the braze compositions of the invention, and in particular of the non-reactive brazes, is that they are ductile and can therefore be easily applied in strip form obtained by rolling.

By means of the braze compositions of the invention we have seen that it is possible to conduct capillary brazing, that is to say infiltration of the braze into the joint without depositing the braze directly between the parts to be assembled.

The invention also concerns the joint and refractory assembly obtained with the above-described process, according to either one of the reactive or non-reactive variants.

Said joint and said assembly essentially have all the advantages inherent in the above-described braze composition and process.

For example, the assemblies of the invention are highly refractory and are able to withstand temperatures which may reach 1600° C. and over.

All the joints obtained by the process of the invention have very good mechanical resistance as defined, for example, by a very high a, and, on mechanical testing, yield always occurs in one of the alumina or metal substrates but never in the joint itself.

Having regard to the non-reactive nature of the non-reactive braze composition, according to the first variant of the invention, it is possible to dissolve the braze if necessary and to proceed with a new brazing operation. Since the braze does not react on the alumina, re-brazing, such as for repair work, is possible.

Other characteristics and advantages of the invention will become clearer on reading the following detailed description which is given for illustration purposes and is non-restrictive.

The process of the invention consists firstly of preparing a braze composition containing aluminium, titanium, palladium and/or nickel in the desired proportions indicated above.

The braze composition is generally in the form of a strip or foil or else in the form of a powder composition. The braze composition may be prepared, for example, by firstly using pure elements to synthesize an intermetallic compound containing aluminium, titanium, palladium and/or nickel.

The synthesis of said intermetallic compound is, for example, made by placing the different metals in wire, piece, bar or other form, preferably bars, in a crucible, preferably in boron nitride, then heating generally to a temperature that is 50° C. greater than the liquidus, that is to say a temperature of 1250 to 1700° C. for example, preferably in a vacuum, that is to say at a pressure of $10^{-3}$ to $10^{-4}$ Pa, or in an inert gas atmosphere, preferably argon, for a time of 5 to 10 minutes to cause the different constituents of said composition to melt and to obtain the desired, homogeneous, end intermetallic compound.

The intermetallic compound obtained, which forms the braze, is then formed, by rolling for example, to obtain a foil or strip having a thickness of generally 50 to 500 µm, preferably 100 to 200 µm.

The first range corresponds more to so-called non-reactive compositions.

The intermetallic compound obtained, forming the braze, may also be ground, in particular if its ductility is insufficient for rolling, which is frequently the case for so-called "reactive" braze compositions.

Grinding may be carried out in any suitable equipment, a mortar for example, to obtain a powder of suitable grain size, that is to say whose grains have a diameter of 1 to 250 µm for example.

The braze powder composition is suspended in conventional manner in a liquid organic binder, preferably relatively viscous, which decomposes between 100 and 300° C. for example leaving no trace. It may for example by a cement of NICROBRAZ® type.

Instead of being synthesized, as described above, said intermetallic compound may also be a commercially available compound, already in the desired formula or converted for the purposes of the process.

The surfaces of the parts to be assembled, for example of two in number, are stripped in an organic solvent of ketone, ester or alcohol type for example, or a mixture thereof etc. one preferred solvent being ethanol, then dried.

The parts to be assembled are generally two in number but it is also possible to simultaneously assemble a larger number of parts which may reach 100.

The braze composition and the process of the invention make it possible to assemble parts in $Al_2O_3$ material, either together or with parts in metal or a metal alloy.

By a part in $Al_2O_3$ material and a part in metal or a metal alloy is generally meant any element, or entity of any shape which, after assembly with one or more other parts, forms structures of larger size.

By alumina-based material is generally meant in this description all materials whose alumina content is 90% by weight or more.

This comprises, for example, sapphire (monocrystalline $Al_2O_3$), or sintered alumina and the alumina-based composites such as the $Al_2O_3/Zro_2$ composites ($Al_2O_3$ matrix), the $Al_2O_3$/mullite composites ($Al_2O_3$ matrix), the $Al_2O_3$/Sic composites ($Al_2O_3$ matrix) and the $Al_2O_3/Si_3N_4$ composites ($Al_2O_3$ matrix).

By part in metal or a metal alloy, is generally meant a part in a metal chosen from among Ti, Al, Ni, Pt, Mo, Zr or one of their alloys.

Preferably, the metal or metal alloy is chosen from among the refractory intermetallic compounds which chiefly contain titanium and aluminium; nickel and aluminium; titanium-based alloys; platinum and molybdenum.

Preferably, the metals or metal alloys must have limited reactivity with the braze and a coefficient of thermal expansion that is suitable for alumina. It is to be noted that by means of the braze composition and the brazing process of the invention, it is possible to use metal alloys whose solidus is greater than 1300° C.—which is the case for the alloys cited above—and to use the alumina-metal/metal alloy assemblies up to temperatures as high as 1200° C. and over.

In the event that the assembly involves only alumina-based parts, the two or more parts to be assembled may be in one same alumina-based material, for example a composite, or each of the parts may be in a different alumina-based material; the same applies if several alumina-based parts are assembled with one or more parts in metal or a metal alloy.

In the same manner, if the parts to be assembled comprise two or more parts in metal or a metal alloy, the two or more parts in metal or a metal alloy may be in one same metal or alloy or each of the parts may be in a different metal or metal alloy.

The braze in strip or foil form, as described above, is cleaned, stripped using an organic solvent similar to the one mentioned above, preferably ethanol, then dried.

The strip or foil is then placed, preferably, between the assembly surfaces of the parts to be assembled. A weight is then placed on the assembly obtained to hold it in place. This weight is generally light (in the order of 20 to 200 g) and is typical for a brazed assembly.

If the braze composition is a powder composition, the assembly surfaces of the parts to be assembled are coated with the suspension of the braze composition, then the surfaces are contacted. Or, it is possible to contact the assembly surfaces of the parts to be assembled and to apply the suspension of the braze composition in the vicinity of the joint formed by the two contacted surfaces.

The parts ready to be brazed are then placed in a furnace, in a vacuum or in a neutral gas atmosphere.

Preferably a vacuum is used for non-reactive brazing and a neutral gas atmosphere for reactive brazing.

Generally, the vacuum is a secondary vacuum, that is to say that the pressure is $10^{-3}$ to $10^{-5}$ Pa, for example $10^{-4}$ Pa.

Preferably, the neutral gas is argon or nitrogen or hydrogen, or 5% hydrogenated argon.

With the invention, it is even possible to use commercial quality argon with a non-negligible partial oxygen pressure.

A first temperature cycle is applied to degas the assembly and optionally to evaporate the binder (de-binding), while the actual brazing is conducted during a second temperature cycle.

The first cycle is conducted for example at a temperature of 100 to 300° C., preferably from 200 to 300° C., for a time of 0.5 to 1 hour for example, preferably 1 hour.

The second cycle is conducted at a temperature corresponding to the melting point of the chosen braze composition, but this temperature is preferably a temperature that is at least 25° C. and preferably 50° C. greater than the liquidus temperature of the composition.

This liquidus temperature varies according to the compositions, for example from 1000 to 1650° C. The brazing temperature will therefore vary, for example from 1050° C. to 1700° C.

More precisely, from 1400 to 1600° C. for example for non-reactive brazing, and from 1050 to 1700° C. for example for reactive brazing.

Said melting temperature of the composition, according to a further advantage of the process of the invention, makes it possible to use the assembly up to a temperature of 1600° C. depending upon the braze composition.

The brazing time, that is to say the heat cycle for forming the assembly, is generally short according to the invention: the cycle time is for example less than 30 minutes, preferably from 5 to 10 minutes, and further preferably 10 minutes.

The furnace pressure is generally a secondary vacuum pressure of $10^{-3}$ to $10^{-5}$ Pa, for example $10^{-4}$ Pa.

When operating in a neutral gas atmosphere, preferably argon, the pressure is $10^{-3}$ to 1 atmosphere.

The assembly is then cooled down to ambient temperature at the rate of 5° C. per minute for example.

With the assemblies of parts in alumina and optionally parts in metal or a metal alloy comprising joints prepared by the process of the invention, it is possible to achieve precision production of structures, equipment, components of complex shape having high operating temperatures which may reach 1600° C.

The advantageous properties of alumina are, among others:

strong hardness;

weak density;

good resistance to abrasion and advantageous dielectric properties.

In addition, alumina has very good chemical resistance to corrosion, for example very good resistance to oxidation, for example in air at high temperature up to 1300° C. for example. Finally, alumina is the technical ceramic which has the most advantageous production cost/quality ratio.

All these properties therefore make alumina a material of choice for numerous present and future high temperature applications.

Among the applications of the assemblies obtained with the process of the invention, mention may be made, among others, of:

Heat exchangers, burners, reactors, pump linings, furnace resistances, but also combustion chambers for the vehicle industry, composites for the aeronautics industry, position sensors to measure spacing between the fixed and mobile parts of aeroplane engines, combustion chamber igniters for aeroplane engines, and generally all structures intended for corrosive environments at temperatures above 1600° C.

All these applications require the assembly of parts in alumina-based material either together or with metal or metal alloys.

EXAMPLE 1

In this example, the wetting and bonding characteristics of various so-called "non-reactive" braze compositions were determined, whether or not they complied with the invention.

Braze compositions were prepared by melting bars of pure metal at a temperature 50° C. above the liquidus temperature in an argon atmosphere.

A small quantity of braze composition obtained was sampled and the wetting characteristics were determined. wettability was determined by the so-called "deposited drop" method which consists of melting the braze composition under consideration and depositing a drop thereof on a substrate.

The wettability of the alloy examined was defined, in conventional manner, by the angle of contact, that is to say the angle between the substrate surface and the tangent at the surface of the drop at its point of contact with the substrate surface. It is considered that wetting occurs if the angle of contact is less than 90°, and that there is no wetting if the angle of contact is greater than 90° C.

Depending upon the interactions between the braze composition and the substrate, the liquid drop forms a bead (non-wetting) or spreads (wetting).

The bonding characteristics of each braze composition were also determined.

The results of wetting and bonding measurements for the different braze compositions are given in table I below, which indicates the type of substrate, the braze composition, the temperature at which the braze compositions were melted, the atmosphere in which melting was conducted, the angle of contact of the braze composition on the substrate and the type of bonding obtained.

TABLE I

WETTING AND BONDING RESULTS OF NON-REACTIVE BRAZE COMPOSITIONS (NI, PD)—AL—TI ON ALUMINA

| SUBSTRATE | BRAZE COMPOSITION (at %) | TEMPERATURE AND ATMOSPHERE | ANGLE OF CONTACT (°) | BONDING |
|---|---|---|---|---|
| monocrystalline $Al_2O_3$ | Pd | 1550° C. - Argon* | 121 | strong interface |
| monocrystalline $Al_2O_3$ | Pd—5 Al—5 Ti | 1600° C. - Argon* | 85 | strong interface |
| monocrystalline $Al_2O_3$ | Pd—10 Al—5 Ti | 1600° C. - Argon* | 80 | weak interface |
| monocrystalline $Al_2O_3$ | Pd—15 Al—10 Ti | 1600° C. - Argon* | 75 | weak interface |
| monocrystalline $Al_2O_3$ | Ni | 1500° C. - Argon* | 112 | strong interface |
| monocrystalline $Al_2O_3$ | Ni—3 Al—3 Ti | 1500° C. - Argon* | 92 | strong interface |
| monocrystalline $Al_2O_3$ | Ni—10 Al—10 Ti | 1500° C. - Argon* | 93 | weak interface |
| monocrystalline $Al_2O_3$ | Ni—15 Al—10 Ti | 1500° C. - Argon* | 85 | weak interface |

(*Argon of commercial purity)

The addition of Al and Ti in small quantities (less than 10 at %) brings an improvement in wetting and leads to obtaining angles of contact close to 900, while maintaining strong bonding between the alloy and the alumina. In addition, examination of the interface shows the absence of any interface reaction product. Outside these compositions, and in the absence of any reaction, an improvement in wetting is still observed, but bonding is weak most probably due to the presence of bubbles at the interface.

EXAMPLE 2

This example concerns the mechanical resistance of a joint between two parts in sintered alumina, obtained with the process of the invention using a non-reactive braze composition of the invention made up, in atomic percentages, of 94% Ni, 3% aluminium and 3% titanium.

a) PREPARATION OF THE BRAZE COMPOSITION AND THE PARTS TO BE ASSEMBLED

A composition of Ni-3 at %, Al-3 at % and Ti was synthesized using pure Ni, Al and Ti metals in bar form.

The pure metals were added to a crucible in boron nitride, then heated in argon to 1500° C. for 5 minutes to obtain the desired, homogeneous, end composition.

The braze obtained is ductile and was rolled to obtain a strip 100 to 200 μm thick.

The strip, cleaned with alcohol, was placed between two parts in alumina, also previously cleaned with alcohol.

A weight was placed on this assembly to hold it in place; this weight is light (20 g) and is typical for a brazed assembly.

b) BRAZING

The above-described assembly was placed in a furnace and the brazing cycle was conducted in a secondary vacuum.

A first cycle at a temperature of 300° C. was first conducted for 1 hour, then actual brazing was conducted under the following operating conditions:

brazing temperature: 1500° C.,
cycle duration: 10 minutes
atmosphere: secondary vacuum ($10^{-5}$ mbar).

The assembly obtained was then cooled down to ambient temperature at the rate of 5° C. per minute.

c) MECHANICAL JOINT TESTING

A mechanical shearing test was made on this joint.

No rupture of the joint occurred when shearing forces of 272 MPa were applied.

EXAMPLE 3

This example concerns the mechanical resistance of a joint between two parts in sintered alumina, obtained by applying the process of the invention with a non-reactive braze composition of the invention, made up, in atomic percentages, of 94% palladium, 3% aluminium and 3% titanium.

a) PREPARATION OF THE BRAZE COMPOSITION AND THE PARTS TO BE ASSEMBLED.

A composition of Ni-3 at %, Al-3 at % and Ti was synthesized from pure Pd, Al and Ti metals in bar form.

The pure metals were added to a crucible in boron nitride, then heated in argon to 1600° C. for 5 minutes to obtain the desired, homogeneous, end composition.

The braze obtained is ductile and was rolled to obtain a strip 100 to 200 μm thick.

The strip, cleaned with alcohol, was placed between two parts in alumina, also previously cleaned with alcohol.

A weight was placed on this assembly to hold it in place; this weight is light (20 g) and is typical for brazed assemblies.

b) BRAZING

The above-described assembly was placed in a furnace and the brazing cycle was conducted in a secondary vacuum. A first cycle at a temperature of 300° C. was firstly carried out for 1 hour.

Then actual brazing was performed under the following operating conditions:

brazing temperature: 1600° C.,
cycle time: 10 minutes
atmosphere: secondary vacuum.

The assembly obtained was then cooled down to ambient temperature at the rate of 5° C. per minute.

c) MECHANICAL JOINT TESTING

A mechanical shearing test was made on this joint. Yield was obtained at 65 MPa.

EXAMPLE 4

In this example, the wetting and bonding characteristics were determined for various reactive braze compositions, both conforming and not conforming to the invention. The preparation of the braze compositions, and the measurements of wettability and bonding were carried out in the same manner as for example 1 above.

Wettability and bonding measurement results for the different braze compositions are given in table II below.

TABLE II

WETTING AND BONDING RESULTS OF REACTIVE BRAZE COMPOSITIONS (NI, PD)—AL—TI ON ALUMINA

| SUBSTRATE | BRAZE COMPOSITION (at %) | TEMPERATURE AND ATMOSPHERE | ANGLE OF CONTACT (°) | BONDING |
|---|---|---|---|---|
| monocrystalline $Al_2O_3$ | Ni—20 Al—20 Ti | 1550° C. - Argon* | 62 | weak interface |
| monocrystalline $Al_2O_3$ | Ni—19 Al—25 Ti | 1550° C. - Argon* | 59 | strong interface |
| monocrystalline $Al_2O_3$ | Ni—12 Al—23 Ti | 1600° C. - Argon* | 50 | strong interface |

(*Argon of commercial purity)

The addition of substantial quantities of Al and Ti makes it possible to obtain good wetting with strong bonding between the alloy and the alumina. In addition, examination of the interface shows a very thin interface reaction product, of the order of a few μm thick. With these compositions, it is possible to obtain controlled reactivity of the braze in thickness and in composition.

EXAMPLE 5

This example concerns the mechanical resistance of a joint between two parts in sintered alumina, obtained by applying the process of the invention, using a reactive braze composition of the invention made up, in atomic percentages, of 25% aluminium, 50% titanium and 25% nickel.

a) PREPARATION OF THE BRAZE COMPOSITION

A composition of Ni-25 at %, Al-50 at % and Ti was synthesized from pure Ni, Al and Ti metals in bar form.

The pure metals were added to a crucible in boron nitride, then heated in argon to 1500° C. for 5 minutes to obtain the desired, homogeneous, end composition.

The braze obtained is ductile and was rolled to obtained a strip 100 to 200 μm thick.

The strip, cleaned with alcohol, was placed between two parts in alumina, also previously cleaned with alcohol.

A weight was placed on this assembly to hold it in place; this weight is light (20 g) and is typical of an brazed assembly.

b) BRAZING

The above-described assembly was placed in a furnace and the brazing cycle was carried out in an argon atmosphere. A first cycle at a temperature of 300° C. was conducted for 1 hour, then actual brazing was conducted under the following operating conditions:

brazing temperature: 1500° C., cycle time: 5 minutes, argon pressure: 1 bar.

The assembly obtained was then cooled down to ambient temperature at the rate of 5° C. per minute.

c) MECHANICAL JOINT TESTING

A mechanical shearing test was made on this joint. Yield was obtained at 127 MPa.

EXAMPLE 6

This example concerns the mechanical resistance of a joint between two parts in sintered alumina, obtained by applying the process of the invention using a reactive braze composition of the invention made up, in atomic percentages, of 20% aluminium, 25% titanium and the remainder nickel.

a) PREPARATION OF THE BRAZE COMPOSITION

A composition of Ni-20 at %, Al-25 at % and Ti was synthesized from pure Ni, Al and Ti metals in bar form;

the pure metals were added to a crucible in boron nitride, then heated in argon to 1500° C. for 5 minutes to obtain the desired, homogeneous, end composition. The braze obtained is ductile and was rolled to obtained a strip 100 to 200 μm thick.

The strip cleaned with alcohol was placed between two parts in alumina, also previously cleaned with alcohol.

A weight was placed on this assembly to hold it in place; this weight is light (20 g) and is typical for a brazed assembly.

b) BRAZING

The above-described assembly was placed in a furnace and the brazing cycle was carried out in an argon atmosphere. A first phase at a temperature of 300° C. was conducted for 1 hour, then actual brazing was conducted under the following operating conditions:

brazing temperature: 1500° C.

cycle time: 5 minutes argon pressure: 1 bar

The assembly obtained was then cooled down to ambient temperature at the rate of 5° C. per minute.

c) MECHANICAL TESTING

During brazing, the braze completely infiltrated the joint through capillarity ensuring very good mechanical resistance of the parts.

A mechanical shearing test was made on this joint. Yield was obtained at 177 MPa.

What is claimed is:

1. Refractory braze composition, non-reactive with alumina, whose atomic percentage composition is 2 to 10% aluminium, 2 to 10% titanium and 80 to 96% of a matrix formed either of palladium, or of nickel, or of a nickel and palladium alloy in all proportions.

2. Refractory braze composition, non-reactive with alumina, according to claim 1, whose atomic percentage composition is 2 to 5% aluminium, 2 to 5% titanium, and 90 to 96% of a matrix formed either of palladium, or of nickel, or of a nickel and palladium alloy in all proportions.

3. Reactive refractory braze composition, whose reactivity with alumina is controlled and whose atomic percentage composition is 2 to 48% aluminium, 10 to 96% titanium and 2 to 80% of a matrix formed either of palladium, or of nickel or of a nickel and palladium alloy in all proportions, provided that the atomic percentage of titanium is greater than the atomic percentage of aluminium.

4. Reactive refractory braze composition, according to claim 3, whose reactivity with alumina is controlled and whose atomic percentage composition is 15 to 30% aluminium, 20 'to 35% titanium and 45 to 60% nickel.

5. Reactive refractory braze composition according to claim 3, whose reactivity with alumina is controlled and whose atomic percentage composition is 2 to 10% aluminium, 35 to 50% titanium, and 45 to 55% nickel.

6. A process of non-reactive refractory brazing of a first part of an alumina-based material to a second part of an alumina-based material, metal or metal alloy in which said parts are contacted with a non-reactive refractory braze composition according to either of claims 1 and 2, the assembly formed by the parts and the braze composition being heated to a sufficient brazing temperature to melt the braze composition in order to form a refractory joint.

7. A process of reactive refractory brazing of a first part of an alumina-based material to a second part of an alumina-based material, metal or metal alloy in which said parts are contacted with a refractory braze composition whose reactivity with alumina is controlled, according to any one of claims 3 to 5, and the assembly formed by the parts and the braze composition is heated to a sufficient brazing temperature to cause the braze composition to metal in order to form a refractory joint.

8. Process according to claim 6, in which the brazing temperature ranges from 1400 to 1600° C.

9. Process according to claim 7, in which the brazing temperature ranges from 1000 to 1750° C.

10. Process according to claim 6, in which the brazing time is 5 to 10 minutes.

11. Process according to claim 6, in which a powder of the braze composition is formed, this powder is placed in suspension with an organic binder and in that the assembly surfaces of the parts to be assembled are coated with the suspension obtained.

12. Process according to claim 6, in which the braze composition is made into foil or strip form.

13. Process according to claim 11, in which said braze composition is placed between the parts to be assembled and/or in their vicinity.

14. Process according to claim 13, in which capillary brazing is conducted.

15. Process according to claim 6, in which said alumina-based material has an alumina content of 90% by weight or more.

16. Process according to claim 6, in which said alumina-based material is chosen from among sapphire, sintered alumina and alumina-based compositions.

17. Process according to claim 16, in which said alumina-based composites are chosen from among $Al_2O_3/ZrO_2$ composites, $Al_2O_3$/mullite composites, $Al_2O_3/SiC$ composites and $Al_2O_3/Si_3N_4$ composites, with $Al_2O_3$ matrices.

18. Process according to claim 6, in which said metal or metal alloy is chosen from among Ti, Al, Ni, Pt, Mo, Zr and their alloys.

19. Process according to claim 18, in which said metal or metal alloy is chosen from among the refractory intermetallic compounds containing titanium and aluminium; metal and aluminium; titanium-based alloys; platinum and molybdenum.

20. Process according to claim 6, in which brazing is conducted in a vacuum or in a neutral gas or reducing gas atmosphere.

21. Process according to claim 20, in which said gas is chosen from among hydrogen, argon, nitrogen and mixtures thereof.

22. Assembly formed with the process according to claim 6.

23. Process according to claim 7, in which the brazing time is 5 to 10 minutes.

24. Process according to claim 7, in which a powder of the braze composition is formed, this powder is placed in suspension with an organic binder and in that the assembly surfaces of the parts to be assembled are coated with the suspension obtained.

25. Process according to claim 23, in which the braze composition is made into foil or strip form.

26. Process according to claim 24, in which said braze composition is placed between the parts to be assembled and/or in their vicinity.

27. Process according to claim 26, in which capillary brazing is conducted.

28. Process according to claim 7, in which said alumina-based material has an alumina content of 90% by weight or more.

29. Process according to claim 7, in which said alumina-based material is chosen from among sapphire, sintered alumina and alumina-based compositions.

30. Process according to claim 29, in which said alumina-based composites are chosen from among $Al_2O_3/ZrO_2$ composites, $Al_2O_3$/mullite composites, $Al_2O_3/SiC$ composites and $Al_2O_3/Si_3N_4$ composites, with $Al_2O_3$ matrices.

31. Process according to claim 7, in which said metal or metal alloy is chosen from among Ti, Al, Ni, Pt, Mo, Zr and their alloys.

32. Process according to claim 31, in which said metal or metal alloy is chosen from among the refractory intermetallic compounds containing titanium and aluminium, metal and aluminium, titanium-based alloys; platinum and molybdenum.

33. Process according to claim 7, in which brazing is conducted in a vacuum or in a neutral gas or reducing gas atmosphere.

34. Process according to claim 33, in which said gas is chosen from among hydrogen, argon, nitrogen and mixtures thereof.

35. Assembly formed with the process according to claim 7.

* * * * *